United States Patent
Joshi

(10) Patent No.: US 9,038,606 B1
(45) Date of Patent: May 26, 2015

(54) DUAL FUEL INJECTION SYSTEM

(71) Applicant: EcoDual, Inc., Beaufort, SC (US)

(72) Inventor: Pushkar Makarand Joshi, Erie, PA (US)

(73) Assignee: EcoDual, Inc., Beaufort, SC (US)

( * ) Notice: Subject to any disclaimer, the term of this patent is extended or adjusted under 35 U.S.C. 154(b) by 0 days.

(21) Appl. No.: 14/533,983

(22) Filed: Nov. 5, 2014

Related U.S. Application Data

(60) Provisional application No. 61/901,200, filed on Nov. 7, 2013.

(51) Int. Cl.
| | |
|---|---|
| *F02B 45/10* | (2006.01) |
| *F02B 43/00* | (2006.01) |
| *F02B 3/06* | (2006.01) |
| *F02B 43/10* | (2006.01) |
| *F02D 41/00* | (2006.01) |
| *F02D 19/06* | (2006.01) |
| *F02M 21/02* | (2006.01) |

(52) U.S. Cl.
CPC .............. *F02D 19/0647* (2013.01); *F02B 3/06* (2013.01); *F02B 43/10* (2013.01); *F02B 45/10* (2013.01); *F02B 2043/103* (2013.01); *F02D 19/06* (2013.01); *F02D 41/00* (2013.01); *F02D 19/0642* (2013.01); *F02D 41/0025* (2013.01); *F02M 21/02* (2013.01)

(58) Field of Classification Search
CPC ............ F02B 3/06; F02B 43/00; F02B 43/10; F02B 45/10; F02B 2043/103; F02D 19/10; F02D 41/00; F02D 41/0025; F02D 19/0642; F02D 19/0613; F02M 21/02
See application file for complete search history.

(56) References Cited

U.S. PATENT DOCUMENTS

| | | | | |
|---|---|---|---|---|
| 5,224,457 | A * | 7/1993 | Arsenault et al. | 123/526 |
| 8,688,351 | B2 * | 4/2014 | Oalen et al. | 701/102 |
| 2014/0290623 | A1 * | 10/2014 | Sivasubramanian et al. | 123/472 |

* cited by examiner

*Primary Examiner* — Hieu T Vo
(74) *Attorney, Agent, or Firm* — Jackson Walker L.L.P.

(57) ABSTRACT

A method of controlling fuel injection in a dual fuel engine system includes determining, with a first controller, a diesel injection pulse indicative of a first amount of diesel fuel to be injected into a combustion chamber of the engine and a first timing at which the first amount of diesel fuel is to be injected. The method also includes determining, with a second controller, a combined injection pulse based on the diesel injection pulse. The method further includes injecting the second amount of diesel fuel and the third amount of natural gas into the combustion chamber in accordance with the combined injection pulse. In such a method, injection in accordance with the combined injection pulse results in a combustion event characterized by a second combustion characteristic substantially equal to a first combustion characteristic associated with the diesel injection pulse.

15 Claims, 5 Drawing Sheets

DUAL FUEL INJECTION SYSTEM

TECHNICAL FIELD

The present disclosure relates generally to a fuel system and, more particularly, to a dual fuel system for use with an internal combustion engine.

BACKGROUND

Many different systems exist for delivering fuel into an engine's combustion chambers. For example, liquid and/or gaseous fuel can be directly injected into the combustion chamber, or indirectly injected into an upstream air passage and allowed to mix with air as the air enters the combustion chamber. In either situation, it can be a challenge to maximize combustion and/or fuel efficiency across all engine operating conditions while, at the same time, meeting emissions requirements associated with combustion exhaust. These challenges are amplified for applications in which more than one fuel is being combusted. For example, in such dual fuel applications, it can be difficult to optimize the amount of each fuel injected, as well as the timing of such injections, such that fuel efficiency is maximized. Additionally, dual fuel injection strategies directed toward maximizing fuel efficiency may not necessarily minimize levels of harmful pollutants present in engine exhaust.

The disclosed system is directed to overcoming one or more of the problems set forth above and/or other problems of the prior art.

SUMMARY

In an exemplary embodiment of the present disclosure, a method of controlling fuel injection in a dual fuel engine system includes determining, with a first controller, a diesel injection pulse indicative of a first amount of diesel fuel to be injected into a combustion chamber of the engine and a first timing at which the first amount of diesel fuel is to be injected. The diesel injection pulse is based on a set of operating parameters associated with the engine, and fuel injection in accordance with the diesel injection pulse would result in a first combustion characteristic within the combustion chamber sufficient to satisfy an output demanded of the engine using solely diesel fuel. The method also includes determining, with a second controller, a combined injection pulse based on the diesel injection pulse. The combined injection pulse is indicative of a second amount of diesel fuel to be injected different than the first amount, a second timing at which the second amount of diesel fuel is to be injected different than the first timing, a third amount of natural gas to be injected, and a third timing at which the third amount of natural gas is to be injected. The method further includes injecting the second amount of diesel fuel and the third amount of natural gas into the combustion chamber in accordance with the combined injection pulse. The injection in accordance with the combined injection pulse results in a combustion event characterized by a second combustion characteristic substantially equal to the first combustion characteristic.

In another exemplary embodiment of the present disclosure, a method of controlling fuel injection in a dual fuel engine system includes receiving, from a sensor, a first signal indicative of at least one operating parameter associated with a dual fuel engine of the system, and determining, with a control system, a diesel injection pulse indicative of a first amount of diesel fuel to be injected into a combustion chamber of the engine and a first timing at which the first amount of diesel fuel is to be injected. The diesel injection pulse is determined based on the at least one operating parameter, and fuel injection in accordance with the diesel injection pulse would result in a first combustion characteristic within the combustion chamber sufficient to satisfy an output demanded of the engine using solely diesel fuel. The method also includes generating, with the control system, a second signal indicative of the diesel injection pulse, and determining, with the control system, a combined injection pulse based on the second signal. The combined injection pulse is indicative of a second amount of diesel fuel to be injected different than the first amount, a second timing at which the second amount of diesel fuel is to be injected different than the first timing, a third amount of natural gas to be injected, and a third timing at which the third amount of natural gas is to be injected. The method further includes directing a third signal indicative of the combined injection pulse to an injection system associated with the engine, and injecting, with the injection system, the second amount of diesel fuel and the third amount of natural gas into the combustion chamber in accordance with the combined injection pulse. The injection in accordance with the combined injection pulse results in a combustion event characterized by a second combustion characteristic substantially equal to the first combustion characteristic. Additionally, the diesel injection pulse determined by the control system is unaffected by the second amount, the second timing, the third amount, and the third timing.

In a further exemplary embodiment of the present disclosure, a dual fuel engine system includes a sensor configured to determine at least one operating parameter associated with a dual fuel engine of the system, and a first controller in communication with the sensor, the first controller configured to determine a diesel injection pulse indicative of a first amount of diesel fuel to be injected into a combustion chamber of the engine and a first timing at which the first amount of diesel fuel is to be injected. The diesel injection pulse is determined based on the at least one operating parameter, and fuel injection in accordance with the diesel injection pulse would result in a first combustion characteristic within the combustion chamber sufficient to satisfy an output demanded of the engine using solely diesel fuel. The system also includes a second controller in communication with the first controller, the second controller configured to determine a combined injection pulse based on the diesel injection pulse. The combined injection pulse is indicative of a second amount of diesel fuel to be injected different than the first amount, a second timing at which the second amount of diesel fuel is to be injected different than the first timing, a third amount of natural gas to be injected, and a third timing at which the third amount of natural gas is to be injected. The system further includes an injection system in communication with the second controller and fluidly connected to the combustion chamber. The injection system is configured to inject the second amount of diesel fuel and the third amount of natural gas into the combustion chamber in accordance with the combined injection pulse. The injection in accordance with the combined injection pulse results in a combustion event characterized by a second combustion characteristic substantially equal to the first combustion characteristic, and the diesel injection pulse determined by the first controller is unaffected by the second amount, the second timing, the third amount, and the third timing.

DETAILED DESCRIPTION

Figure 1:
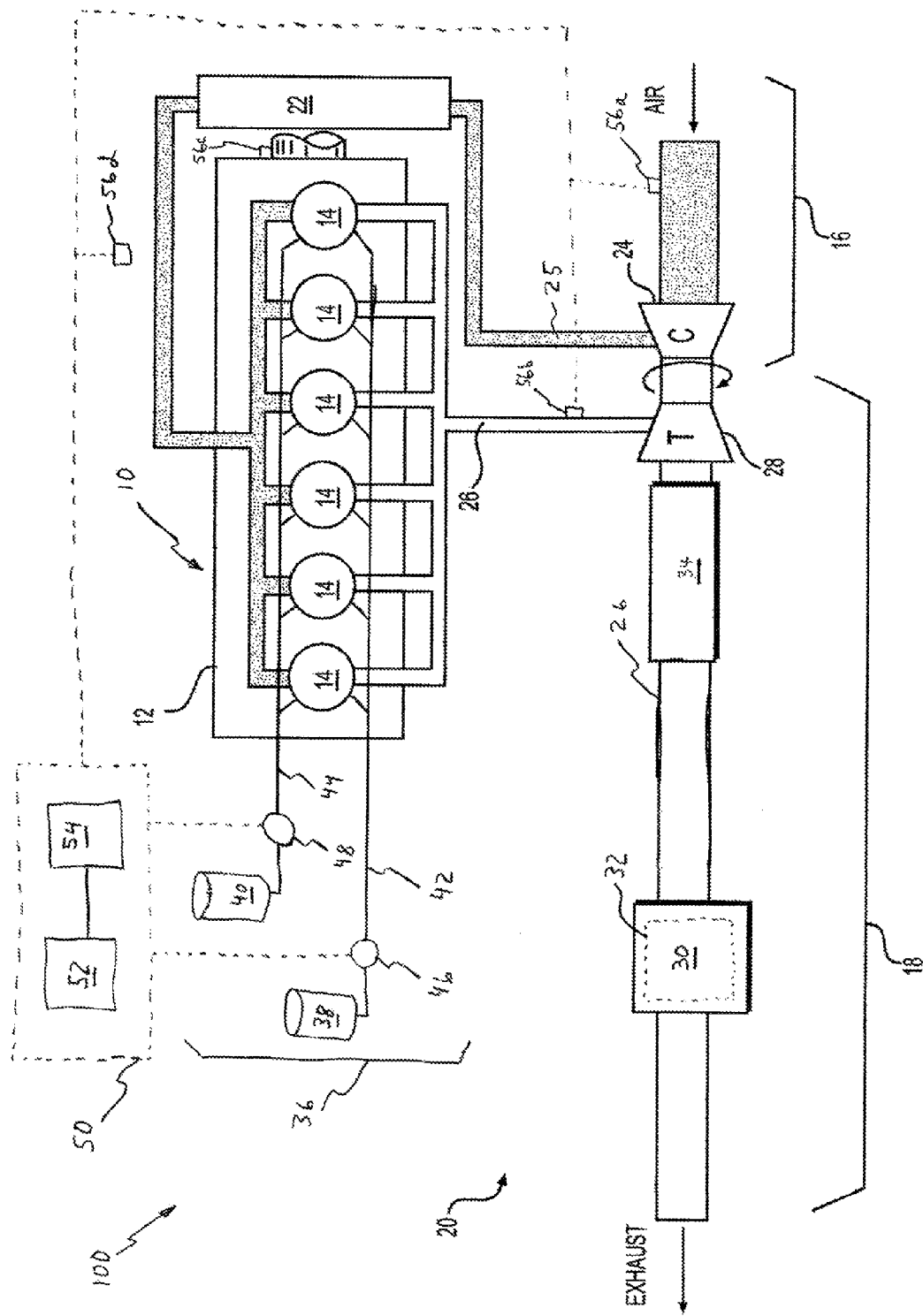
FIG. 1 is an illustration of an exemplary dual fuel engine system.

FIG. 1 illustrates an exemplary dual fuel engine system 100 of the present disclosure, including an exemplary engine 10. For the purposes of this disclosure, engine 10 is depicted and described as a dual fuel internal combustion engine, such as an internal combustion engine configured to combust diesel and natural gas, or a mixture thereof. However, it is contemplated that engine 10 may embody any other type of combustion engine such as, for example, a diesel engine, a gasoline engine, or a gaseous fuel-powered engine burning compressed or liquefied natural gas, propane, or methane. Engine 10 may include an engine block 12 at least partially defining a plurality of cylinders 14. As will be described with respect to FIG. 2, engine 10 may also include a plurality of piston assemblies disposed within respective cylinders 14 to form a plurality of combustion chambers. It is contemplated that engine 10 may include any number of combustion chambers and that the combustion chambers may be disposed in an in-line configuration, in a "V" configuration, in an opposing-piston configuration, or in any other conventional configuration.

Multiple separate sub-systems may be associated within engine 10 and such sub-systems may cooperate to facilitate the production of power. For example, system 100 may include an air induction system 16, an exhaust system 18, an aftertreatment system 20, a fuel system 36, and a control system 50. Air induction system 16 may be configured to direct air or an air and fuel mixture into engine 10 for subsequent combustion. Fuel system 36 may be configured to direct one or more fuels, or a mixture of fuels, to either the air induction system 16 or directly to the combustion chambers. Exhaust system 18 may exhaust byproducts of combustion to the atmosphere. Aftertreatment system 20 may function to reduce the discharge of regulated constituents by engine 10 to the atmosphere. Control system 50 may be in communication with engine 10 and with components of each of the air induction system 16, exhaust system 18, aftertreatment system 20, and fuel system 36, and may be configured to control operation of such components.

Air induction system 16 may include multiple components configured to condition and introduce compressed air into cylinders 14. For example, air induction system 16 may include an air cooler 22 located downstream of one or more compressors 24. Compressors 24 may be connected to pressurize inlet air directed through cooler 22. It is contemplated that air induction system 16 may include different or additional components than described above such as, for example, a throttle valve, variable valve actuators associated with each cylinder 14, filtering components, compressor bypass components, exhaust gas recirculation components, and/or other known components that may be selectively controlled to affect an air-to-fuel ratio of engine 10, if desired. It is further contemplated that compressor 24 and/or cooler 22 may be omitted, if a naturally aspirated engine is desired.

Exhaust system 18 may include multiple components that condition and direct exhaust from cylinders 14 to the atmosphere. For example, exhaust system 18 may include an exhaust passage 26 and one or more turbines 28 driven by exhaust flowing through passage 26. It is contemplated that exhaust system 18 may include different or additional components than described above such as, for example, bypass components, an exhaust compression or restriction brake, an attenuation device, and other known components, if desired.

Turbine 28 may be located to receive exhaust leaving engine 10, and may be connected to one or more compressors 24 of air induction system 16 by way of a common shaft to form a turbocharger. As the hot exhaust gases exiting engine 10 move through turbine 28 and expand against vanes (not shown) thereof, turbine 28 may rotate and drive the connected compressor 24 to pressurize inlet air.

Aftertreatment system 20 may include components configured to trap, catalyze, reduce, or otherwise remove regulated constituents from the exhaust flow of engine 10 prior to discharge to the atmosphere. For example, aftertreatment system 20 may include a reduction device 30 fluidly connected downstream of turbine 28.

Reduction device 30 may receive exhaust from turbine 28 and reduce particular constituents of the exhaust. In one example, reduction device 30 is a Selective Catalytic Reduction (SCR) device having one or more serially-arranged catalyst substrates 32 located downstream from a reductant injector (not shown). A gaseous or liquid reductant, most commonly urea $((NH_2)_2C0)$, a water/urea mixture, a hydrocarbon such as diesel fuel, or ammonia gas $(NH_3)$, may be sprayed or otherwise advanced into the exhaust within passage 26 at a location upstream of catalyst substrate(s) 32 by the reductant injector. This process of injecting reductant upstream of catalyst substrate 32 may be known as "dosing" catalyst substrate(s) 32. To facilitate dosing of catalyst substrate(s) 32 an onboard supply of reductant, a pressurizing device, and/or other like components (not shown) may be associated with the reductant injector and/or the substrate 32. The reductant sprayed into passage 26 may flow downstream with the exhaust from engine 10 and be adsorbed onto the surface of catalyst substrate(s) 32, where the reductant may react with $NO_x$ (NO and $NO_2$) in the exhaust gas to form water $(H_2O)$ and elemental nitrogen $(N_2)$. This reduction process performed by reduction device 30 may be most effective when a concentration of NO to $NO_2$ supplied to reduction device 30 is about 1:1.

To help provide the correct concentration of NO to $NO_2$, an oxidation catalyst 34 may be located upstream of reduction device 30, in some embodiments. Oxidation catalyst 34 may be, for example, a diesel oxidation catalyst (DOC). As a DOC, oxidation catalyst 34 may include a porous ceramic honeycomb structure or a metal mesh substrate (not shown) coated with a material, for example a precious metal, which catalyzes a chemical reaction to alter the composition of the exhaust. For instance, oxidation catalyst 34 may include a washcoat of palladium, platinum, vanadium, or a mixture thereof that facilitates the conversion of NO to $NO_2$.

In one embodiment, oxidation catalyst 34 may also perform particulate trapping functions. That is, oxidation catalyst 34 may be a catalyzed particulate trap such as a continuously regeneration particulate trap or a catalyzed continuously regenerating particulate trap. A particulate trap is a filter designed to trap or collect particulate matter. In further exemplary embodiments, the oxidation catalyst 34 may be a separate component disposed upstream or downstream of a particulate trap in the exhaust system 18.

Fuel system 36 includes first and second fuel sources 38, 40, respective fuel lines 42, 44, fluidly connecting fuel sources 38, 40 to cylinders 14, and one or more respective fuel pumps, valves, restrictors, mixers, accumulators, filters, and/ or other known fuel delivery components 46, 48 configured to pressurize, regulate, clean, and/or controllably direct fuel from the first and second fuel sources 38, 40 to the respective cylinders 14. Such components 46, 48 may be configured for use with any of the liquid and/or gaseous fuels described herein.

First and second fuel sources 38, 40 may comprise fuel tanks or other containers (e.g., pressurized cylinders) suitable to serve as a reservoir for fuel. The fuel may be held within first and second fuel sources 38, 40 in gaseous or liquid form, as desired. In one example, if held as a liquid, fuel within first fuel source 38 may first be gasified before being directed into fuel line 42. Gasification may occur through a change in pressure and/or application of heat to the fuel, and one or more components 46 fluidly connected to fuel line 42 may assist with such gasification. In another example, if held as a gas, fuel within second fuel source 40 may be maintained at an elevated pressure, and may be controllably released using one or more control valves, or other like components 48 fluidly connected to fuel line 44. Additionally, in such embodiments, first and second fuel sources 38, 40 may comprise one or more metals, alloys, composites, or other like materials to assist in reinforcing one or more walls thereof in order to facilitate safe storage, transportation, and release of pressurized fuels.

Control system 50 may include one or more controllers in communication with engine 10 and/or components of the subsystems 16, 18, 20, 36 described herein. In an exemplary embodiment, control system 50 may include a first controller 52, and a second controller 54 in communication with the first controller 52. One of the first and second controllers 52, 54 may comprise an electronic control unit (ECU) of the machine to which engine 10 is connected. In such an embodiment, second controller 54 may be added and/or otherwise connected to the machine and configured to communicate with an existing first controller 52, so as to receive information from the first controller 52 but not inhibit the normal function of the first controller 52. In such embodiments, second controller 54 may be configured to receive one or more signals originating from first controller 52, and to condition and/or otherwise modify such signals. Alternatively, second controller 54 may utilize such signals as inputs into one or more control algorithms and/or protocols, and may generate additional signals based on the signals received from first controller 52. Additionally, first and second controllers 52, 54 may be in communication with one or more sensors 56a, 56b, 56c, 56d (collectively referred to as "sensors 56"). In such embodiments, sensors 56 may generate signals indicative of one or more operating parameters of engine 10 and/or components of the subsystems 16, 18, 20, 36. Sensors 56 may direct such signals to at least one of first and second controllers 52, 54 for use as inputs into the one or more control algorithms and/or protocols described herein. The interaction of, for example, sensors 56, control system 50, and fuel system 36 will be described in greater detail below.

Figure 2:
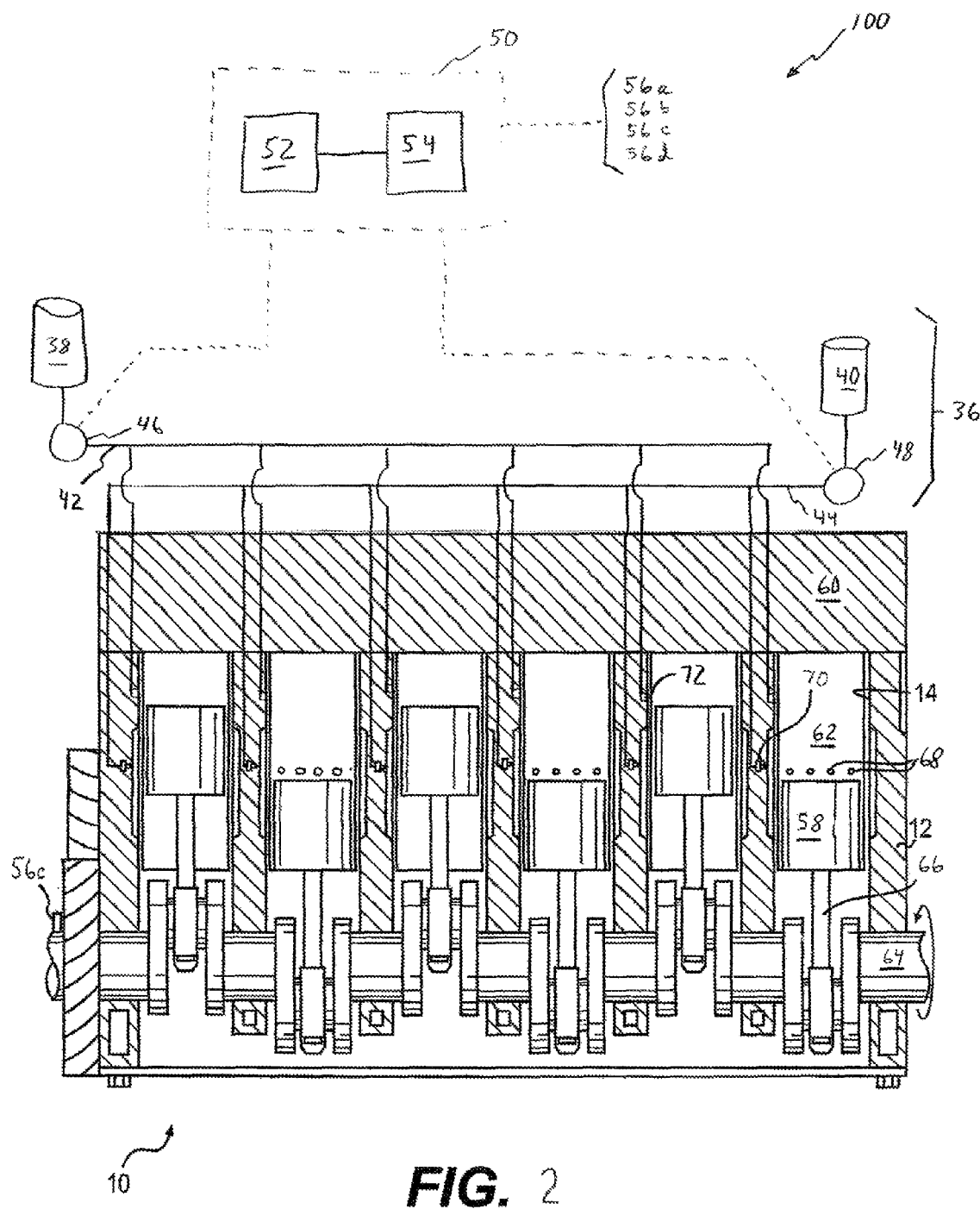
FIG. 2 is an illustration of a dual fuel engine associated with the system shown in FIG. 1.

FIG. 2 illustrates exemplary components of engine 10 in further detail. As shown in FIG. 2, a piston 58 may be slidably disposed within each cylinder 14 to reciprocate between a top-dead-center (TDC) position and a bottom-dead-center (BDC) position, and a cylinder head 60 may be associated with each cylinder 14. Cylinder 14, piston 58, and cylinder head 60 may together define a combustion chamber 62 of engine 10. It is contemplated that engine 10 may include any number of combustion chambers 62 and, as noted above, such combustion chambers 62 may be disposed in an "in-line" configuration, in a "V" configuration, in an opposing-piston configuration, or in any other suitable configuration.

Engine 10 may also include a crankshaft 64 that is rotatably disposed within engine block 12. A connecting rod 66 may connect each piston 58 to crankshaft 64 so that a sliding motion of piston 58 between the TDC and BDC positions within each respective cylinder 14 results in a rotation of crankshaft 64. Similarly, a rotation of crankshaft 64 may result in a sliding motion of pistons 58 between the TDC and BDC positions. As crankshaft 64 rotates through about 180 degrees (i.e., as crankshaft 64 moves through one-half of its rotation), each piston 58 may move through one full stroke between BDC and TDC. In embodiments in which engine 10 comprises a four-stroke engine, piston 58 may reciprocate between the TDC and BDC positions during each of an intake stroke, a compression stroke, a combustion or power stroke, and an exhaust stroke (also known as a "piston cycle") for every complete engine cycle or two full rotations of crankshaft 64. Thus, in exemplary embodiments, each piston cycle of a four-stroke engine may include two 360° rotations of crankshaft 64. In an alternative embodiment, engine 10 may be a two-stroke engine, and may have a complete cycle that includes a power/exhaust/intake stroke (TDC to BDC) and an intake/compression stroke (BDC to TDC). In such embodiments, a piston cycle of a two-stroke engine may include a single 360° rotation of crankshaft 64.

During a phase of the power/exhaust/intake stroke described, air may be drawn into combustion chamber 62 via one or more air intake ports 68 located within a sidewall of each cylinder 14 (e.g., within a liner of each cylinder 14). In particular, as piston 58 moves downward within cylinder 14, a position will eventually be reached at which air intake ports 68 are no longer blocked by piston 58 and instead are fluidly communicated with combustion chamber 62. When air intake ports 68 are in fluid communication with combustion chamber 62 and a pressure of air at air intake ports 68 is greater than a pressure within combustion chamber 62, air will pass through air intake ports 68 into combustion chamber 62.

Eventually, piston 58 will start an upward movement that blocks air intake ports 68 and compresses the air/fuel mixture. It is understood that the air/fuel mixture may comprise a mixture of air, liquid fuel, and gaseous fuel. As the air/fuel mixture within combustion chamber 62 is compressed, a temperature and pressure of the mixture may increase and, at a point when piston 58 is near TDC, the air/fuel mixture may ignite. This ignition may result in a release of chemical energy in the form of temperature and pressure spikes (also known as "pressure pulses") within combustion chamber 62.

During a phase of the power/exhaust/intake stroke, the pressure pulse within combustion chamber 62 may force piston 58 downward, thereby imparting mechanical power to crankshaft 64. At a particular point during this downward travel, one or more exhaust ports (not shown) located within cylinder head 60 (or elsewhere) may open to allow pressurized exhaust within combustion chamber 22 to exit and the cycle will restart.

Gaseous fuel (e.g., methane or natural gas), may be introduced into combustion chamber 62 (e.g., radially injected) through at least one of air intake ports 68. The gaseous fuel may mix with the air to form a fuel/air mixture within combustion chamber 62. Alternatively, gaseous fuel may be injected into intake passage 25 of air induction system 16. For example, gaseous fuel may be injected into intake passage 25 between compressor 24 and air cooler 22, or downstream of air cooler 22, such as in an intake manifold of engine 10. In such embodiments at least one mixer (not shown) may be utilized to facilitate substantially homogeneous mixing of the injected gaseous fuel with the intake air. In still further embodiments, such as in a shared port intake system, gaseous fuel may be provided to multiple ports 68, substantially simultaneously, from a single source. In any of the embodiments described herein, one or more injectors 70 may be fluidly connected to each cylinder 14, such as via one of more ports 68, to inject gaseous fuel into combustion chamber 62. Additionally, injectors 70 may be fluidly connected to second fuel source 40 and components 48 via fuel line 44. In exemplary embodiments, injectors 70 may be fluidly connected to second fuel source 40 and components 48 via a common fuel rail, or other like fuel manifold fluidly connected to fuel line 44.

In a similar way, liquid fuel (e.g., diesel or gasoline) may also be introduced into combustion chamber 62 via a respective injector 72 fluidly connected to each cylinder 14. For example, injectors 72 may inject pressurized liquid fuel, at any desirable location within combustion chamber 62, to facilitate substantially homogenous mixing with gaseous fuel injected into combustion chamber 62 and/or the fuel/air mixture formed by the mixture of gaseous fuel and intake air. Additionally, injectors 72 may be fluidly connected to first fuel source 38 and components 46 via fuel line 42. In exemplary embodiments, injectors 72 may be fluidly connected to first fuel source 38 and components 46 via a common fuel rail, or other like fuel manifold fluidly connected to fuel line 42. The respective timing and volume of both liquid and gaseous fuel injected into combustion chamber 62 may be controlled by control system 50 and/or fuel system 36 to produce a combustion event within each combustion chamber 62 having desired characteristics. Such control will be described in further detail below.

In one embodiment, each gaseous fuel injector 70 may be positioned adjacent the liner of a corresponding cylinder 14 at a particular air intake port 68, such that a nozzle of fuel injector 70 is in direct communication with combustion chamber 62 via the air intake port 68. In another embodiment, one or more fuel injectors 70 may indirectly communicate with combustion chamber 62, for example, via a recess or cavity that functions as a distribution and/or mixing manifold at air intake ports 68. Likewise, each liquid fuel injector 72 may be positioned adjacent the liner of a corresponding cylinder 14, and a nozzle of each fuel injector 72 may be spaced from respective intake ports 68. Each respective nozzle of fuel injectors 72 may be in direct fluid communication with combustion chamber 62, as desired, to affect proper injection and/or mixing of liquid fuel with gaseous fuel and/or air within the combustion chamber 62. Alternatively, one or more fuel injectors 72 may indirectly communicate with combustion chamber 62, for example, via the recess or cavity described above, that functions as a distribution and/or mixing manifold proximate air intake ports 68. In exemplary embodiments, at least one of fuel injectors 70, 72 may comprise a solenoid-actuated injector, and in further embodiments, at least one of fuel injectors 70, 72 may employ one or more solenoids to control the injection of fuel.

As shown in FIGS. 1 and 2, components 46, 48, sensors 56, and/or other components of the system 100 may be controllably connected to one or both of first and second controllers 52, 54 of control system 50. Controllers 52, 54 may embody a single or multiple microprocessors, field programmable gate arrays (FPGAs), digital signal processors (DSPs), etc., that include a means for controlling an operation of fuel system 36 in response to signals received from one or more sensors 50. Numerous commercially available microprocessors can be configured to perform the functions of controller 40. It should be appreciated that controllers 52, 54 could readily embody a general engine microprocessor capable of controlling numerous system functions and modes of operation. Various other known circuits may be associated with controllers 52, 54, including power supply circuitry, signal-conditioning circuitry, actuator driver circuitry (i.e., circuitry powering solenoids, motors, or piezo actuators), communication circuitry, and other appropriate circuitry.

Sensors 50 may be configured to generate a signal indicative of an engine operating parameter and/or a set of operating parameters. In one example, the set of operating parameters may be associated with and/or may otherwise include a speed of engine 10, a speed of a vehicle to which engine 10 is connected, a load of engine 10, a temperature of intake air directed to engine 10 via intake passage 25, a temperature of ambient air, a temperature of exhaust emitted by engine 10, and/or other like operating parameters. For example, sensor 56a may be configured to measure, sense, and/or otherwise determine a temperature of ambient air or intake air. Sensor 56b may be configured to measure, sense, and/or otherwise determine at least one of an exhaust temperature and an exhaust pressure. Sensor 56c may be disposed proximate crankshaft 64, and configured to measure and generate a signal indicative of an instantaneous angular position of crankshaft 64. Based on a change in this position relative to time, a speed of engine 10 may be derived. The position information may also or alternatively be used to determine the positions of pistons 58. Sensor 56d may comprise one or more additional sensors configured to determine, for example, accelerator pedal position, brake pedal position, transmission gear selection, and/or other like operating parameters. Based on signals generated by sensor 56d, an output demanded of engine 10, such as a speed of engine 10, a torque generated by engine 10, an acceleration required of engine 10, a deceleration required of engine 10 and/or other like outputs may be determined by controllers 52, 54. Additionally, based on the engine speed, piston positions, engine load, intake temperature, and/or other operating parameters described herein, as well as the one or more outputs demanded of engine 10, controllers 52, 54 may be configured to determine a timing at which fuel should be injected into combustion chamber 62 and/or a quantity of fuel that should be injected. Controllers 52, 54 may selectively activate components 46, 48 to affect injection of desired respective quantities of a first fuel and a second fuel at desired respective timings in a piston cycle of the combustion chambers 62.

The disclosed embodiments may be applicable to any combustion engine where active and individualized control over separate fuel injection events is desired. For example, the disclosed dual fuel engine system 100 may be used in association with a machine such as an over-the-road vehicle, an off-road vehicle, and/or any other like machine used in construction, transportation, shipping, farming, mining, power generation, and/or other applications. Such machines may include, for example, light-duty trucks/vehicles, heavy-duty trucks/vehicles, dozers, loaders, excavators, tractors, and the like.

In operation, engine 10 may combust a combination of fuels in order to satisfy an output demanded of engine 10. System 100 may facilitate providing engine 10 with corresponding amounts of a first fuel and a second fuel, at specific respective timings during each piston cycle to affect such an output. In exemplary embodiments, system 10 may be tuned and/or otherwise controlled such that a combustion characteristic (such as a peak pressure within combustion chamber 10, a torque output of the combustion chamber 10, a combustion of approximately 50 percent of the fuel within the combustion chamber 10 at a desired crank angle, and/or a peak combustion temperature within the combustion chamber 10) achieved by combusting the first and second fuels may be substantially equal to a corresponding combustion characteristic that would be achieved by combustion of only the first fuel under like engine load/demand conditions. By injecting and combusting first and second fuels in accordance with the strategies discussed herein, emission of particulate matter, and other harmful pollutants in the exhaust of engine 10 may be reduced without sacrificing engine performance. Indeed, due to the use of natural gas and other like "clean burning" fuels, in some situations engine performance may be improved while emissions are reduced. Operation of system 100 will now be described in detail with respect to FIGS. 3-5.

Figure 3:
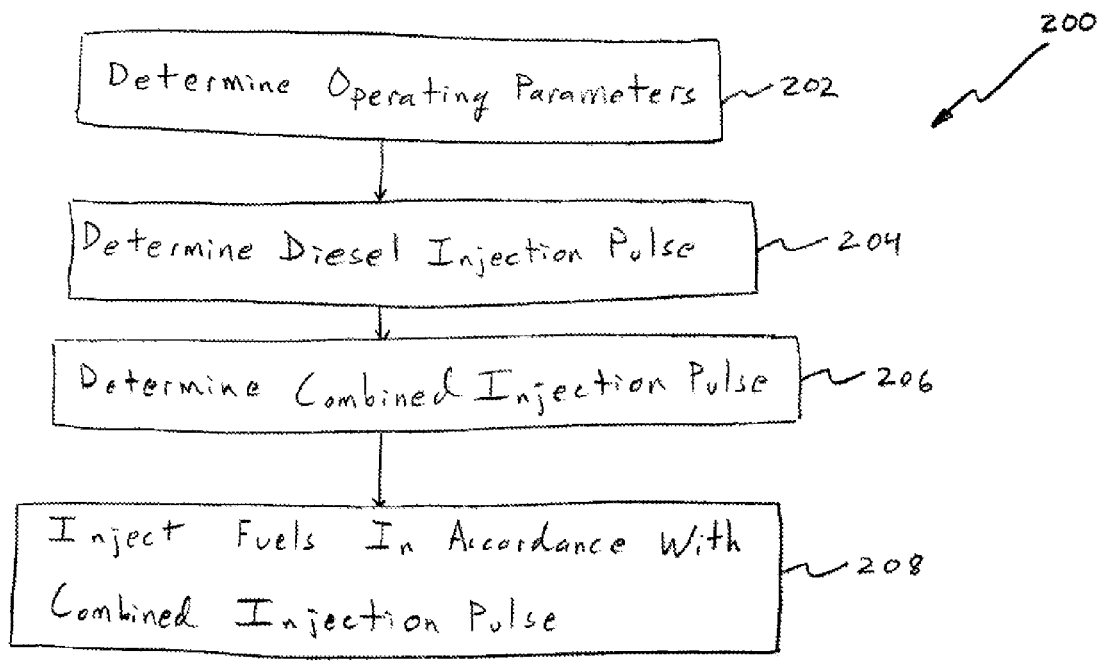
FIG. 3 is a flowchart illustrating an exemplary method of the present disclosure.

As shown in the exemplary flowchart 200 illustrated in FIG. 3, at 202 control system 50 and/or associated sensors 56 may determine one or more operating parameters associated with system 100. For example, sensors 56 may measure, sense, calculate, and/or otherwise determine one or more operating parameters associated with engine 10, induction system 16, exhaust system 18, aftertreatment system 20, fuel system 36, and/or components thereof. Each respective sensor 56 may direct one or more corresponding signals indicative of such operating parameters to the control system 50 for processing. For example, sensors 56 may determine a set of operating parameters including at least one of the travel speed of a vehicle to which engine 10 is connected, a load of engine 10, a speed of engine 10, a temperature of intake air directed to engine 10 by induction system 16, a temperature of exhaust emitted by engine 10, a gear selection associated with a transmission connected to engine 10, a position of an acceleration pedal and/or a brake pedal associated with engine 10, and/or other like parameters. It is understood that one or more such operating parameters may be indicative of an output demanded of engine 10. For example, an operator of a vehicle to which engine 10 is connected may demand a particular engine speed, engine torque, engine acceleration, engine deceleration, and/or other like engine outputs, and one or more of the operating parameters determined by sensors 56 may be indicative of such engine outputs. In particular, the position of the acceleration pedal and/or brake pedal associated with engine 10 may be an operating parameter that is indicative of engine speed, engine acceleration, or engine deceleration. At 202, sensors 56 may direct signals indicative of such operating parameters to one or both of first and second controllers 52, 54. In an exemplary embodiment, such signals may initially be sent to first controller 52 for processing. In such an embodiment, first controller 52 may comprise an OEM ECU associated with engine 10. Since first and second controllers 52, 54 are communicatively and/or operably connected, signals sent to first controller 52 may be passed to or observed by second controller 54 in any known manner.

At 204, control system 50 may determine a diesel injection pulse indicative of a first amount of diesel fuel to be injected into one or more combustion chambers 62 of engine 10, as well as a first timing at which the determined first amount of diesel fuel is to be injected. For example, first controller 52 may receive one or more of the signals from sensors 56 described above and may, in response, determine the first amount of diesel fuel and the first injection timing. As referred to herein, an "injection timing" may comprise a crank angle (i.e., a rotational position and/or angle of crankshaft 64), a corresponding piston location within cylinder 14 during a respective piston cycle, an elapsed time, with respect to TDC or BDC, associated with a respective piston cycle, and/or any other known timing indicators associated with movement of crankshaft 64 or piston 58. Likewise, as referred to herein, an "amount" of fuel to be injected may comprise any volume of liquid or gaseous fuel. In exemplary embodiments, the diesel injection pulse may be determined at 204 based on at least one of the operating parameters described above. Additionally, it is understood that fuel injection in accordance with the determined diesel injection pulse may result in a first combustion characteristic within combustion chamber 62 sufficient to satisfy an output demanded of engine 10 using solely diesel fuel. In particular, the first diesel amount and first diesel timing associated with the diesel injection pulse may comprise the calculated (i.e., demanded) fuel volume and injection timing required to meet the engine output requested by an operator using only diesel fuel. In embodiments in which first controller 52 comprises an OEM ECU coupled to engine 10, the diesel injection pulse may comprise a standard single fuel output signal of the ECU without any modifications or adjustments made to optimize dual fuel operation of engine 10.

Figure 4:
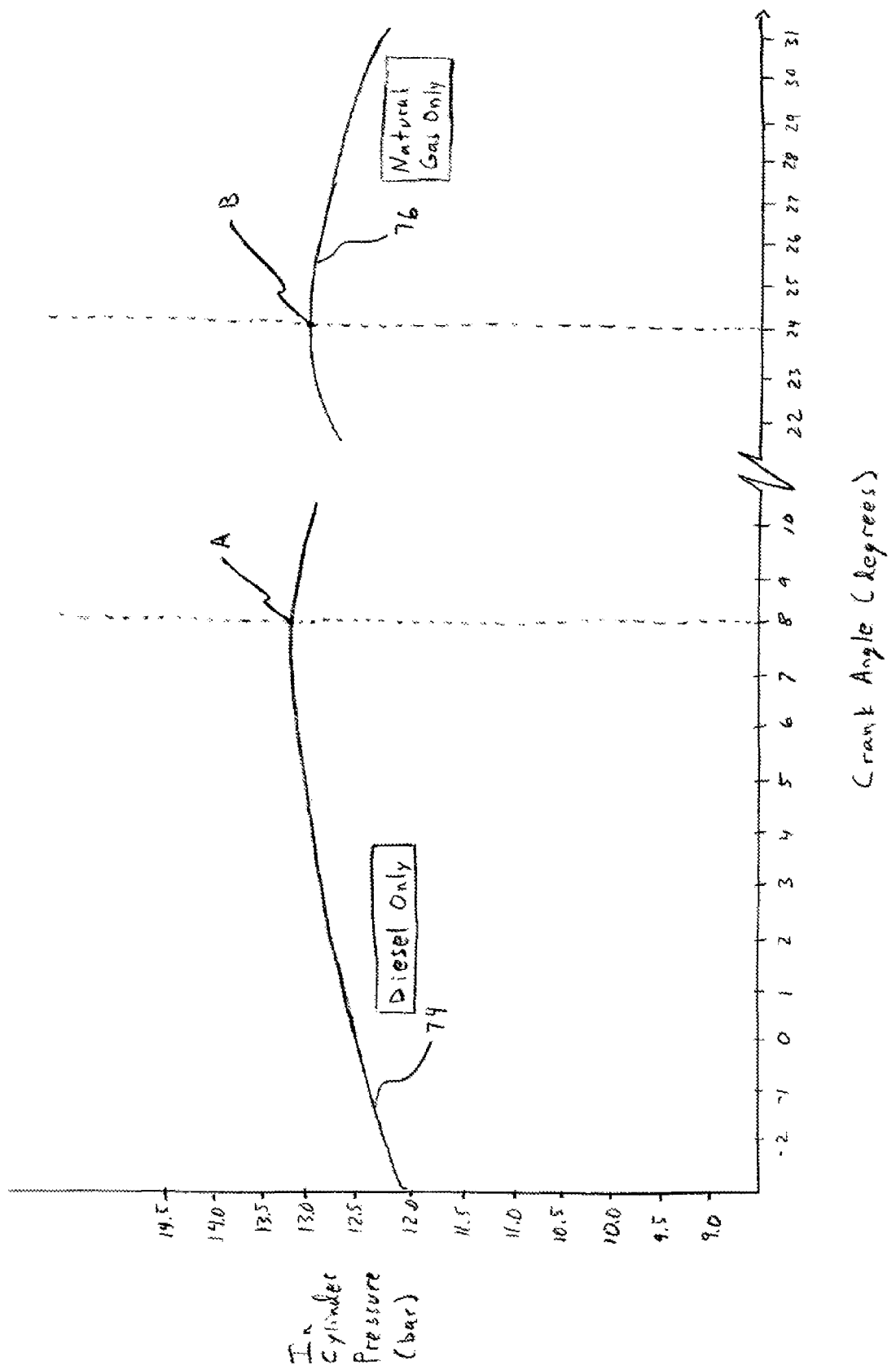
FIG. 4 is an exemplary pressure pulse diagram associated with the system of FIG. 1.

As noted above, in exemplary embodiments a first combustion characteristic of the present disclosure may comprise a peak pressure generated within combustion chamber 62, a torque output from combustion chamber 62, and/or a particular crank angle at which a peak pressure or a desired torque output is generated within combustion chamber 62. For example, as illustrated in FIG. 4 engine 10 may be tuned such that, for a given engine speed, a pressure within cylinder 14 is maximized as piston 58 is disposed proximate TDC. In particular, the exemplary pressure pulse plot 74 of FIG. 4 associated with operation of engine 10 using only diesel fuel indicates that, for a given engine speed, a pressure within cylinder 14 may be maximized at point A. Tuning engine 10 such that approximately 50 percent of fuel within combustion chamber 62 is combusted when piston 58 reaches the crank angle associated with point A may minimize the levels of harmful pollutants contained in engine exhaust. However, such engine tuning may not necessarily maximize the fuel efficiency of engine 10 in all applications. It is understood that the crank angles at which maximum fuel efficiency and/or minimum emissions occurs may vary based on the size, type, and/or class of engine, as well as the fuel or mixture of fuels being combusted. It is also understood that that engine 10 may be tuned such that, for a given engine speed, torque output of cylinder 14 is maximized as piston 58 is disposed proximate TDC.

Natural gas, on the other hand, may combust at a different rate than diesel fuel. For example, pressure pulse plot 76 associated with operation of engine 10 using only natural gas indicates that, for given engine speed, a pressure within cylinder 14 may be maximized at point B. It is understood that each of the crank angles described herein are merely exemplary and/or approximate since, as noted above, the crank angles at which maximum fuel efficiency and/or minimum emissions occurs may vary based on the size, type, and/or class of engine, as well as the fuel or mixture of fuels being combusted. It is also understood that that engine 10 may be tuned such that, for a given engine speed, torque output of cylinder 14 is maximized as piston 58 is disposed proximate TDC.

While engine 10 may be tuned to optimize fuel efficiency and/or to minimize emissions based on the combustion characteristics illustrated by respective pressure pulse plots 74, 76 when either diesel or natural gas is used, combusting both diesel and natural gas efficiently during the same piston cycle requires separate control of the amount of diesel fuel injected into combustion chamber 62, the timing at which the diesel fuel is injected, the amount of natural gas injected into combustion chamber 62, and the timing at which the natural gas is injected. In exemplary dual fuel embodiments, active control of the respective amount and timing of diesel and natural gas injection may enable system 100 to match the fuel efficiency, peak pressure, torque output, exhaust emissions characteristics, and/or other combustion characteristics associated with engine operation using solely diesel fuel. In particular, since as illustrated in FIG. 4, natural gas combusts at a different rate than diesel fuel, strategies of the present disclosure may advance or retard the timing of diesel fuel injection, or advance or retard the timing of natural gas injection during the piston cycle. Such an injection strategy may result in a dual fuel peak pressure and/or a dual fuel torque output that substantially matches the diesel fuel only peak pressure and/or a diesel fuel only torque output. For example, system 100 may be configured to execute a dual fuel injection strategy in which, at a given engine load, the torque or power output of combustion chamber 62 is approximately equal to a corresponding torque or power output of combustion chamber 62 when only diesel fuel is combusted therein.

To achieve the injection strategies described above, at 206 control system 50 may determine a combined injection pulse based on, among other things, the diesel injection pulse determined at 204. In an exemplary embodiment, first controller 52 may generate a signal indicative of the diesel injection pulse and may transmit such a signal to second controller 54. Second controller 54 may be configured to determine the combined injection pulse at 206 based on the diesel injection pulse signal received from first controller 52. Alternatively, first controller 52 may generate a signal indicative of the diesel injection pulse and may transmit such a signal to components of fuel system 36 in order to facilitate injection of diesel fuel only. In exemplary embodiments in which such a signal is directed from first controller 52 to fuel system 36, second controller 54 may be configured to intercept such a signal and to determine a combined injection pulse at 206 based on such a signal. In such embodiments, the determination of the diesel injection pulse by first controller 52 may be unaffected by, for example, determination of the combined injection pulse at 206 and/or by operations of second controller 54.

In exemplary embodiments, the combined injection pulse determined at 206 may be indicative of a second amount of diesel fuel to be injected different than the first amount of diesel fuel associated with the diesel injection pulse. The combined injection pulse may also be indicative of a second timing at which the second amount of diesel fuel is to be injected, and such a second timing may be different than the first timing associated with injection of the first amount of diesel fuel. Additionally, the combined injection pulse may be indicative of an amount of natural gas to be injected and a timing at which the amount of natural gas is to be injected. Accordingly, in exemplary embodiments of the present disclosure, the combined injection pulse may comprise a single injection pulse or multiple injection pulses. In embodiments in which the combined injection pulse comprises multiple injection pulses, the combined injection pulse may comprise a pair of fuel injection pulses associated with a dual fuel injection/combustion strategy. In such embodiments, one of the dual fuel injection pulses may be indicative of an amount of diesel fuel to be injected and a timing at which the amount of diesel fuel is to be injected, and another of the dual fuel injection pulses may be indicative of an amount of natural gas to be injected and a timing at which the amount of natural gas is to be injected. Thus, for purposes of this disclosure, the terms "combined injection pulse" and "dual fuel injection pulse(s)" may be used interchangeably. In exemplary embodiments, first controller 52 may determine the diesel injection pulse at 204 in conjunction with and/or corresponding to determining a variety of other demanded control parameters including an amount of turbo boost to be provided by turbine 28, an amount of exhaust gas to be recirculated to induction system 16, and/or other like parameters. Accordingly, since second controller 54 determines the combined injection pulse at 206 based on the diesel injection pulse, second controller 54 inherently determines the combined injection pulse based on these additional demanded control parameters.

In exemplary embodiments, second controller 54 may determine the combined injection pulse at 206 in response to receiving and/or intercepting a signal from first controller 52 indicative of the diesel injection pulse. Further, it is understood that the amount and/or timing of diesel fuel injection associated with the combined injection pulse determined at 206 may be different than the corresponding amount and/or timing of diesel fuel injection associated with the diesel injection pulse determined at 204. For example, the timing of diesel fuel injection associated with the combined injection pulse may be earlier in a piston cycle of combustion chamber 62 than the timing of the diesel fuel injection associated with the diesel injection pulse determined at 204. It is also understood that the timing natural gas injection associated with the combined injection pulse determined at 206 may be earlier, later, and/or otherwise different than the timing of diesel fuel injection associated with the combined injection pulse.

Figure 5:
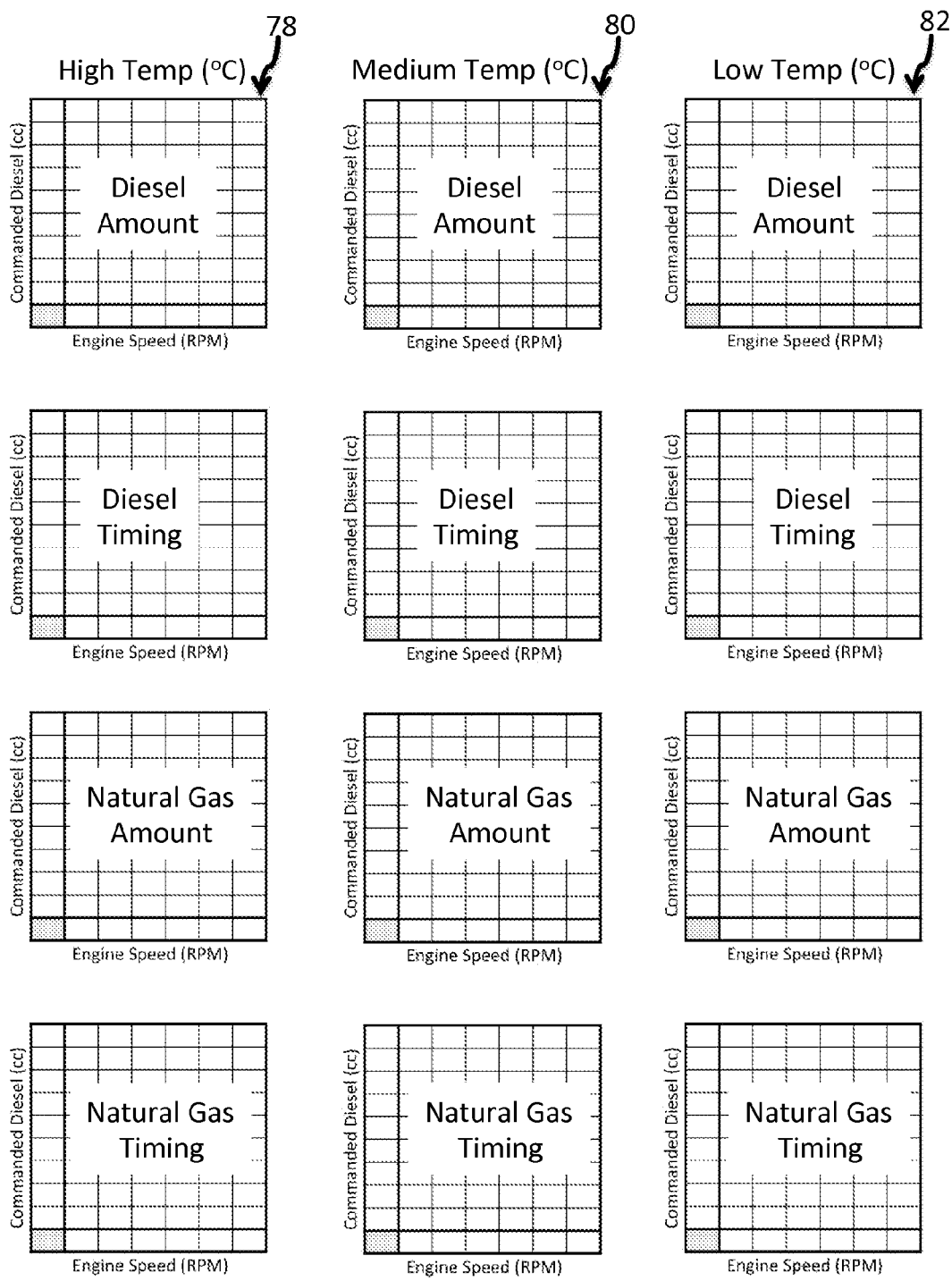
FIG. 5 illustrates exemplary lookup tables associated with the system of FIG. 1.

In each of the exemplary embodiments described above, second controller 54 may determine the combined injection pulse at 206 utilizing one or more lookup tables stored in a memory associated with control system 50. Exemplary lookup tables 78, 80, 82 are illustrated in FIG. 5. For example, upon receiving and/or intercepting a signal indicative of the first diesel amount associated with the diesel injection pulse, and a signal indicative of current engine speed, second controller 54 may reference one or more of lookup tables 78, 80, 82 to identify a second diesel amount, a second diesel timing, a natural gas amount, and a natural gas timing corresponding to the first diesel amount and current engine speed. In such embodiments, current engine speed and the first (i.e., commanded) diesel amount of the diesel injection pulse may be used by second controller 54 as inputs to one or more of lookup tables 78, 80, 82, and the second diesel amount, second diesel timing, natural gas amount, and natural gas timing may comprise corresponding lookup table outputs.

In further exemplary embodiments, at least one of intake air temperature and ambient air temperature determined by sensors 56 may be may be used by second controller 54 as inputs to one or more of lookup tables 78, 80, 82, or as inputs to an algorithm or control protocol associated with determining the combined injection pulse. In such embodiments, the second diesel amount, second diesel timing, natural gas amount, and natural gas timing associated with the combined injection pulse may be determined at 206 based on the at least one of intake air temperature and ambient air temperature. For example, at 206, second controller 54 may receive one or more signals from sensors 56 indicative of at least one of intake air temperature and ambient air temperature, and may select, based on the at least one of intake air temperature and ambient air temperature, a set of lookup tables for use in determining the combined injection pulse. For instance, at 206, second controller 54 may compare the at least one of intake air temperature and ambient air temperature to corresponding temperature thresholds or to corresponding temperature ranges. As illustrated in FIG. 5, such ranges may include a high temperature range, a medium temperature range, and a low temperature range. At 206, second controller 54 may select the temperature range or temperature threshold to which the at least one of intake air temperature and ambient air temperature corresponds, and may utilize the lookup tables associated with the selected temperature range or temperature threshold to determine the second diesel amount, second diesel timing, natural gas amount, and natural gas timing associated with the combined injection pulse. As described above, the second diesel amount, second diesel timing, natural gas amount, and natural gas timing associated with the combined injection pulse may be outputs of the selected one or more lookup tables.

At 208, fuel system 36 may be controlled by control system 50 to inject diesel fuel and natural gas into combustion chamber 62 in accordance with the combined injection pulse determined at 206. For example, at 208 the second amount of diesel fuel determined in association with the combined injection pulse may be injected into combustion chamber 62 at the corresponding second injection timing determined at 206. Additionally, at 208 the amount of natural gas determined in association with the combined injection pulse may be injected into combustion chamber 62 at the corresponding natural gas injection timing determined at 206. In each of the exemplary embodiments described herein, injecting the second amount of diesel fuel and the amount of natural gas into the combustion chamber 62 in accordance with the combined injection pulse determined at 206 may result in a combustion event within the combustion chamber 62 characterized by a second combustion characteristic that is substantially equivalent and/or otherwise equal to the first combustion characteristic described above. For example, injecting both diesel and natural gas into combustion chamber 62 in accordance with the combined injection pulse may result in a peak pressure being generated within combustion chamber 62 that is substantially equal to the peak pressure described above with respect to point A of FIG. 4 (i.e., in a configuration in which only diesel fuel is combusted in engine 10), and/or a desired torque output.

It will be apparent to those skilled in the art that various modifications and variations can be made to the disclosed fuel system. Other embodiments will be apparent to those skilled in the art from consideration of the specification and practice of the disclosed fuel system. It is intended that the specification and examples be considered as exemplary only, with a true scope being indicated by the following claims and their equivalents.

What is claimed is:

1. A dual fuel engine system, comprising:
    a sensor configured to determine at least one operating parameter associated with a dual fuel engine of the system;
    a first controller in communication with the sensor, the first controller configured to determine a diesel injection pulse indicative of a first amount of diesel fuel to be injected into a combustion chamber of the engine and a first timing at which the first amount of diesel fuel is to be injected, wherein the diesel injection pulse is determined based on the at least one operating parameter and wherein fuel injection in accordance with the diesel injection pulse would result in a first combustion characteristic within the combustion chamber sufficient to satisfy an output demanded of the engine using solely diesel fuel; and
    a second controller in communication with the first controller so as to receive information from the first controller without inhibiting operation of the first controller, the second controller configured to determine a combined injection pulse based on the diesel injection pulse, wherein the combined injection pulse is indicative of a second amount of diesel fuel to be injected different than the first amount, a second timing at which the second amount of diesel fuel is to be injected different than the first timing, a third amount of natural gas to be injected, and a third timing at which the third amount of natural gas is to be injected;
    an injection system in communication with the second controller and fluidly connected to the combustion chamber, the injection system being configured to inject the second amount of diesel fuel and the third amount of natural gas into the combustion chamber in accordance with the combined injection pulse, wherein the injection in accordance with the combined injection pulse results in a combustion event characterized by a second combustion characteristic substantially equal to the first combustion characteristic, and wherein the diesel injection pulse determined by the first controller is unaffected by the second amount, the second timing, the third amount, and the third timing.

2. The system of claim 1, wherein the sensor comprises a temperature sensor and the at least one parameter comprises at least one of intake air temperature and ambient air temperature, the system further configured to determine an engine speed corresponding to the first amount,
    the second controller being configured to select, based on the at least one of intake air temperature and ambient air temperature, a set of look-up tables stored in a memory of the second controller for use in determining the second amount, the second timing, the third amount, and the third timing, and
    to determine, based on the first amount and the engine speed, the second amount, the second timing, the third amount, and the third timing using the set of look-up tables.

3. A method of controlling fuel injection in a dual fuel engine system, comprising:
    determining, with a first controller, a diesel injection pulse indicative of a first amount of diesel fuel to be injected into a combustion chamber of the engine and a first timing at which the first amount of diesel fuel is to be injected, wherein the diesel injection pulse is based on a set of operating parameters associated with the engine and wherein fuel injection in accordance with the diesel injection pulse would result in a first combustion characteristic within the combustion chamber sufficient to satisfy an output demanded of the engine using solely diesel fuel;
    determining, with a second controller, a combined injection pulse based on the diesel injection pulse, wherein the combined injection pulse is indicative of a second amount of diesel fuel to be injected different than the first amount, a second timing at which the second amount of diesel fuel is to be injected different than the first timing, a third amount of natural gas to be injected, and a third timing at which the third amount of natural gas is to be injected; and
    injecting the second amount of diesel fuel and the third amount of natural gas into the combustion chamber in accordance with the combined injection pulse, wherein the injection in accordance with the combined injection pulse results in a combustion event characterized by a second combustion characteristic substantially equal to the first combustion characteristic.

4. The method of claim 1, wherein the set of operating parameters comprises at least one of vehicle speed, engine load, engine speed, intake temperature, and exhaust temperature.

5. The method of claim 1, wherein the output demanded of the engine comprises at least one of engine speed, engine torque, engine acceleration, and engine deceleration.

6. The method of claim 1, further comprising receiving, with the first controller, a first signal indicative of the output demanded of the engine, and determining the diesel injection pulse in response to receiving the first signal.

7. The method of claim 1, wherein the first combustion characteristic comprises a torque generated by the engine.

8. The method of claim 7, wherein the second timing is earlier in a piston cycle of the combustion chamber than the first timing.

9. The method of claim 7, wherein the third timing is different than the second timing, and wherein the torque is generated during the combustion event by injecting the third amount of natural gas into the combustion chamber at the third timing.

10. A method of controlling fuel injection in a dual fuel engine system, comprising:
   receiving a first signal indicative of at least one operating parameter associated with a dual fuel engine of the system;
   determining, with a control system, a diesel injection pulse indicative of a first amount of diesel fuel to be injected into a combustion chamber of the engine and a first timing at which the first amount of diesel fuel is to be injected, wherein the diesel injection pulse is determined based on the at least one operating parameter and wherein fuel injection in accordance with the diesel injection pulse would result in a first combustion characteristic within the combustion chamber sufficient to satisfy an output demanded of the engine using solely diesel fuel;
   generating, with the control system, a second signal indicative of the diesel injection pulse;
   determining, with the control system, a combined injection pulse based on the second signal, wherein the combined injection pulse is indicative of a second amount of diesel fuel to be injected different than the first amount, a second timing at which the second amount of diesel fuel is to be injected different than the first timing, a third amount of natural gas to be injected, and a third timing at which the third amount of natural gas is to be injected;
   directing a third signal indicative of the combined injection pulse to an injection system associated with the engine; and
   injecting, with the injection system, the second amount of diesel fuel and the third amount of natural gas into the combustion chamber in accordance with the combined injection pulse, wherein the injection in accordance with the combined injection pulse results in a combustion event characterized by a second combustion characteristic substantially equal to the first combustion characteristic, and wherein the diesel injection pulse determined by the control system is unaffected by the second amount, the second timing, the third amount, and the third timing.

11. The method of claim 10, wherein the first combustion characteristic comprises a torque generated by the engine.

12. The method of claim 10, wherein the at least one operating parameter comprises one of vehicle speed, engine load, engine speed, intake temperature, and exhaust temperature.

13. The method of claim 12, wherein the at least one operating parameter includes engine speed, and wherein determining the combined injection pulse includes determining the second amount, the second timing, the third amount, and the third timing based on the engine speed and the first amount.

14. The method of claim 10, wherein the at least one operating parameter further includes at least one of intake air temperature and ambient air temperature, and wherein determining the combined injection pulse further includes determining the second amount, the second timing, the third amount, and the third timing based on the at least one of intake air temperature and ambient air temperature.

15. The method of claim 10, further including
   sensing at least one of intake air temperature and ambient air temperature,
   selecting, based on the at least one of intake air temperature and ambient air temperature, a set of look-up tables for use in determining the second amount, the second timing, the third amount, and the third timing,
   determining the second amount, the second timing, the third amount, and the third timing with the set of look-up tables based on the first amount and an engine speed corresponding to the first amount.

* * * * *

UNITED STATES PATENT AND TRADEMARK OFFICE
CERTIFICATE OF CORRECTION

Page 1 of 1

PATENT NO.         : 9,038,606 B1
APPLICATION NO.    : 14/533983
DATED              : May 26, 2015
INVENTOR(S)        : Pushkar Makarand Joshi It is certified that error appears in the above-identified patent and that said Letters Patent is hereby corrected as shown below:

In the Claims

Please amend claims 4-7 as follows:

4. The method of claim [[1]] 3, wherein the set of operating parameters comprises at least one of vehicle speed, engine load, engine speed, intake temperature, and exhaust temperature.

5. The method of claim [[1]] 3, wherein the output demanded of the engine comprises at least one of engine speed, engine torque, engine acceleration, and engine deceleration.

6. The method of claim [[1]] 3, further comprising receiving, with the first controller, a first signal indicative of the output demanded of the engine, and determining the diesel injection pulse in response to receiving the first signal.

7. The method of claim [[1]] 3, wherein the first combustion characteristic comprises a torque generated by the engine.

Signed and Sealed this
Seventeenth Day of November, 2015

Michelle K. Lee
*Director of the United States Patent and Trademark Office*